United States Patent
Takaoka et al.

(10) Patent No.: US 10,108,380 B2
(45) Date of Patent: Oct. 23, 2018

(54) INFORMATION PROCESSING APPARATUS THAT ACQUIRES INFORMATION FROM EXTERNAL APPARATUS AND NON-TRANSITORY COMPUTER READABLE MEDIUM STORING PROGRAM

(71) Applicant: FUJI XEROX CO., LTD., Tokyo (JP)

(72) Inventors: Satoshi Takaoka, Kanagawa (JP); Kiyoko Shimadate, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/788,801

(22) Filed: Oct. 20, 2017

(65) Prior Publication Data
US 2018/0121146 A1   May 3, 2018

(30) Foreign Application Priority Data

Oct. 27, 2016 (JP) .................................. 2016-210269

(51) Int. Cl.
*G06F 3/12* (2006.01)
(52) U.S. Cl.
CPC .......... *G06F 3/1257* (2013.01); *G06F 3/1224* (2013.01)

(58) Field of Classification Search
None
See application file for complete search history.

(56) References Cited

U.S. PATENT DOCUMENTS

| | | | |
|---|---|---|---|
| 2008/0162949 A1* | 7/2008 | Sato | G06F 21/14 713/194 |
| 2015/0082299 A1* | 3/2015 | Kobayashi | G06F 8/61 717/174 |
| 2015/0188986 A1* | 7/2015 | Okubo | H04L 69/14 709/219 |

FOREIGN PATENT DOCUMENTS

| | | |
|---|---|---|
| JP | 2001-273254 | 10/2001 |
| JP | 2002-196964 | 7/2002 |
| JP | 2015125657 | 7/2015 |

* cited by examiner

*Primary Examiner* — Andrew H Lam
(74) *Attorney, Agent, or Firm* — JCIPRNET (57) ABSTRACT

An information processing apparatus includes an information holding unit that holds pieces of information acquired from an external apparatus; an execution unit that reads a partial program having specific information, among the pieces of information acquired from the external apparatus, described therein, and executes a program including the partial program with reference to the pieces of information held in the information holding unit.

13 Claims, 8 Drawing Sheets

INFORMATION PROCESSING APPARATUS THAT ACQUIRES INFORMATION FROM EXTERNAL APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2016-210269 filed Oct. 27, 2016.

BACKGROUND

Technical Field

The present invention relates to an information processing apparatus and a non-transitory computer readable medium storing a program.

SUMMARY

According to an aspect of the invention, there is provided an information processing apparatus including an information holding unit that holds pieces of information acquired from an external apparatus; and an execution unit that reads a partial program having specific information, among the pieces of information acquired from the external apparatus, described therein with respect to the specific information and executes programs including the partial program with reference to the pieces of information held in the information holding unit.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the invention will be described in detail with reference to the accompanying drawings.

Figure 1:
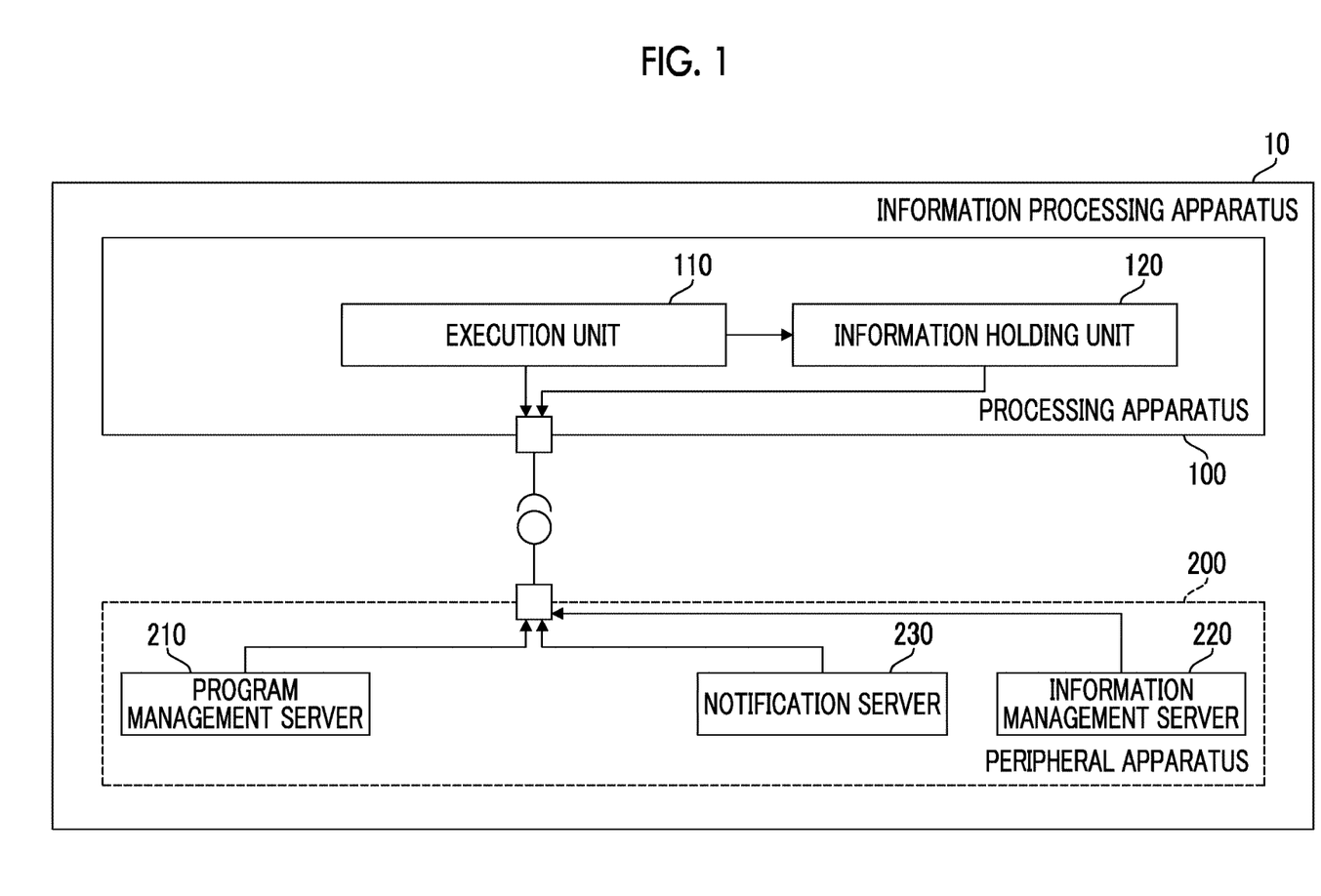
FIG. 1 is a diagram illustrating the overall configuration of an information processing apparatus according to this exemplary embodiment.

Configuration of Information Processing Apparatus to Which This Exemplary Embodiment is Applied FIG. 1 is a diagram illustrating the overall configuration of an information processing apparatus 10 according to this exemplary embodiment.

The information processing apparatus 10 according to this exemplary embodiment includes a processing apparatus 100 and plural peripheral apparatuses 200. The processing apparatus 100 and the peripheral apparatus 200 are components (modules) constituting the information processing apparatus 10. In addition, the peripheral apparatus 200 is positioned as an external apparatus (external module) with respect to the processing apparatus 100.

The processing apparatus 100 includes an execution unit 110 that execute processing on the basis of information acquired from the peripheral apparatus 200, and an information holding unit 120 that holds the information acquired from the peripheral apparatus 200. The execution unit 110 acquires information (information acquired from the peripheral apparatus 200) to be referred to for the execution of processing from the information holding unit 120 when the information is held in the information holding unit 120, and acquires the information from the peripheral apparatus 200 when the information is not held in the information holding unit 120. The information holding unit 120 acquires the information from the peripheral apparatus 200 in accordance with a (for example, when the information holding unit 120 is started up, when a request is given from the execution unit 110, and the like) which is determined in advance, and holds the acquired information in a memory of the information processing apparatus 10. Therefore, the information holding unit 120 functions as a so-called cache memory in the processing apparatus 100. The functions of the execution unit 110 and the information holding unit 120 are realized by reading a program by a Central Processing Unit (CPU) of the information processing apparatus 10.

In the example illustrated in FIG. 1, one execution unit 110 is illustrated within the processing apparatus 100, but plural execution units 110 are provided in the real processing apparatus 100. Each of the execution unit 110 is started up when satisfying a start-up condition which is set in advance therein, and stops when satisfying a stop condition which is set in advance therein. For example, the execution unit may be configured to be started up when a start-up operation of an operator of the information processing apparatus 10 is performed and to stop when a stop operation is performed. In addition, in the operation of a specific execution unit 110, another specific execution unit 110 may be configured to be called and started up or to be stopped. Further, the execution unit may be configured to be started up on a condition that information of the peripheral apparatus 200 to be referred to in the processing of the execution unit. The information holding unit 120 is started up in accordance with the startup of the processing apparatus 100, and continuously operates until the processing apparatus 100 is stopped.

The peripheral apparatus 200 is an apparatus that performs processing and control which are determined in advance and performs various functions of the information processing apparatus 10. In the example illustrated in FIG. 1, only three types of servers are illustrated as the peripheral apparatus 200, but various peripheral apparatuses 200 are actually provided in accordance with functions required to be realized in the information processing apparatus 10. Some peripheral apparatuses 200 include a computation unit or a memory for controlling a specific mechanism or processing data. The memories of some peripheral apparatuses 200 store information to be referred to when the execution unit 110 of the processing apparatus 100 executes processing. Although details will be described later, computation units of some peripheral apparatus 200 generate a program (program module) to be executed by the execution unit 110 during the startup of the information processing apparatus 10.

In addition, in this exemplary embodiment, servers controlling the transmission of information of another peripheral apparatus 200 to the processing apparatus 100 are provided as the peripheral apparatus 200. In the example illustrated in FIG. 1, as the servers, a program management server 210, an information management server 220, and a notification server 230 are provided. The program management server 210 manages a program executed by the execution unit 110 of the processing apparatus 100. The information management server 220 manages information to be referred to when the execution unit 110 of the processing apparatus 100 executes processing. The notification server 230 notifies the processing apparatus 100 that information has been updated, in a case where the information managed by the information management server 220 has been updated.

Here, as an example, a case where communication between the processing apparatus 100 and the peripheral apparatus 200 (the program management server 210, the information management server 220, and the notification server 230) is performed by an HTTP is considered. In this case, for example, a configuration may be adopted in which a Web server, a Soap server, and a Web Socket server are used as the program management server 210, the information management server 220, and the notification server 230, respectively.

The information processing apparatus 10 according to this exemplary embodiment may be applied to various apparatuses that include the processing apparatus 100 and the plural peripheral apparatuses 200 and execute processing on the basis of pieces of information acquired from the peripheral apparatuses 200 by the processing apparatus 100. As an example of a specific apparatus configured in this manner, a description will be given of an example in which the information processing apparatus 10 according to this exemplary embodiment is applied to an image processing apparatus.

Figure 2:
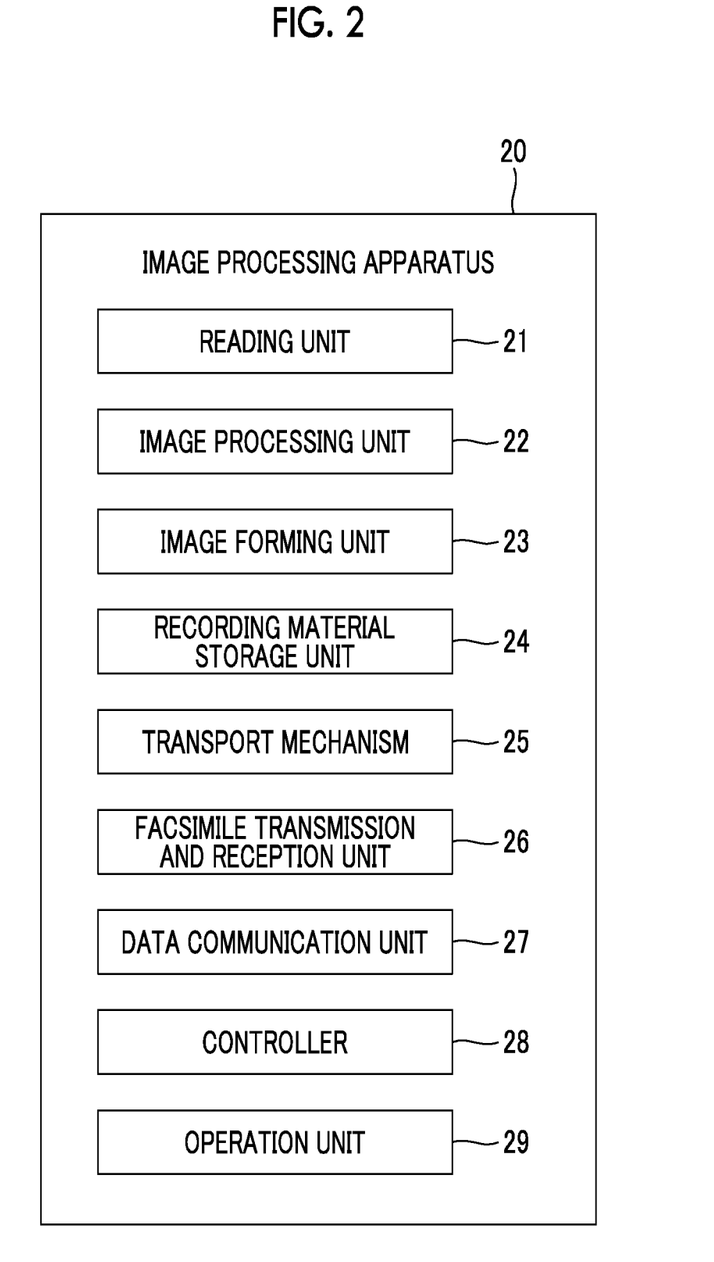
FIG. 2 is a diagram illustrating an example of a functional configuration of the image processing apparatus.

FIG. 2 is a diagram illustrating an example of a functional configuration of an image processing apparatus.

As illustrated in FIG. 2, an image processing apparatus 20 includes a reading unit 21 that reads an image, an image processing unit 22 that processes an image, and an image forming unit 23 that forms an image on a recording material such as a sheet. In addition, the image processing apparatus 20 includes a recording material storage unit 24 that stores a recording material, and a transport mechanism 25 that transports the recording material. In addition, the image processing apparatus 20 includes a facsimile transmission and reception unit 26 that performs transmission and reception using a facsimile, and a data communication unit 27 that performs data communication through a network. Further, the image processing apparatus 20 includes a controller 28 that controls operations of respective units, and an operation unit 29 that receives an operation for using various functions of the image processing apparatus 20. Meanwhile, the functional configuration illustrated in FIG. 2 is not limited to the example, and the image processing apparatus to which the information processing apparatus 10 according to this exemplary embodiment may be applied is not limited to the configuration illustrated in FIG. 2. For example, the information processing apparatus 10 according to this exemplary embodiment may be applied to a printer dedicated machine that does not include the reading unit 21 and the facsimile transmission and reception unit 26. In addition, the information processing apparatus 10 according to this exemplary embodiment may be applied to an apparatus in which an external apparatus such as a post-processing apparatus is added as the peripheral apparatus 200. The external apparatus performs binding processing or the like on the recording material which has an image formed thereon and is discharged.

In a case where the information processing apparatus 10 according to this exemplary embodiment is applied to the image processing apparatus 20 illustrated in FIG. 2, for example, the operation unit 29 may be configured as the processing apparatus 100, and the other units may be configured as the peripheral apparatus 200. Here, the operation unit 29 includes a display capable of switching, for example, an operation item or setting contents, and an operation device for performing an input operation on the basis of a screen (operation screen) displayed on the display. As the display, for example, a liquid crystal display is used. As the operation device, for example, a button key, a touch sensor, or the like is used. As an example, the operation unit 29 may be constituted by a touch panel configured by combining a touch sensor with the liquid crystal display as the display.

As described above, in a case where communication between the processing apparatus 100 and the peripheral apparatus 200 is performed by an HTTP and the operation unit 29 is configured as the processing apparatus 100, the function of the processing apparatus 100 including the execution unit 110 and the information holding unit 120 is realized by, for example, a web browser. In this case, the execution unit 110 and the information holding unit 120 of the processing apparatus 100 are realized by a script operating on a web browser, or the like. The execution unit 110 may be provided for each function, such as an execution unit 110 that receives an operation for using a copy function, an execution unit 110 that receives an operation for using an image formation output function, an execution unit 110 that receives an operation for using an image reading function.

The operation unit 29 as the processing apparatus 100 acquires information from the reading unit 21, the image processing unit 22, the image forming unit 23, the recording material storage unit 24, the transport mechanism 25, the facsimile transmission and reception unit 26, the data communication unit 27, and the controller 28 as the peripheral apparatus 200. As a specific example, information regarding whether or not an image may be formed using a color and whether or not an image maybe formed using only white and black colors is obtained from the image forming unit 23. In addition, information regarding the number of stages of a tray storing a recording material and information regarding the presence or absence, size, and the like of a recording material of each tray are obtained from the recording material storage unit 24. In addition, pieces of information regarding the storage capacity of the memory mounted on the controller 28, whether various functions are valid or invalid, whether pieces of information regarding various functions are set to be in a display state or a non-display state, and a connection condition of a network are obtained from the controller 28. The operation unit 29 edits the operation screen on the basis of the pieces of information acquired from the peripheral apparatuses 200, and displays the pieces of information on the display.

The image processing apparatus 20 as the information processing apparatus 10 according to this exemplary embodiment is provided with a control apparatus (computer)

including a CPU and a storage apparatus. The control apparatus functions as the execution unit 110 of the processing apparatus 100, and functions as the controller 28 which is the peripheral apparatus 200. In addition, the control apparatus also function as controllers of the image processing unit 22, the facsimile transmission and reception unit 26, the data communication unit 27, and the like. The storage apparatus of the control apparatus is provided with a non-volatile Read Only Memory (ROM) storing a program executed by the CPU, and a Random Access Memory (RAM) which is used as a work memory or the like in the processing of the CPU. The CPU executes a program stored in the storage apparatus so that the functions of the processing apparatus 100 and the peripheral apparatus 200 are realized. Meanwhile, here, a CPU realizing the function of the processing apparatus 100 and a CPU realizing the function of the peripheral apparatus 200 are not particularly distinguished from each other, but such a configuration of hardware is not particularly limited. For example, one CPU may be configured to execute plural programs realizing functions of respective apparatuses, or each apparatus may be configured to include a processor for individually executing a program.

The controller 28 as the peripheral apparatus 200 functions as the program management server 210, the information management server 220, and the notification server 230 described with reference to FIG. 1. That is, the controller 28 as the program management server 210 manages a program executed by the execution unit 110 of the processing apparatus 100. In addition, the controller 28 as the information management server 220 acquires information referred to when the execution unit 110 of the processing apparatus 100 executes processing, from the peripheral apparatus 200, and manages the information. In addition, the controller 28 as the notification server 230 notifies the processing apparatus 100 that the information managed by the information management server 220 has been updated, in a case where the information has been updated.

Classification of Information Acquired from Peripheral Apparatus by Processing Apparatus In this exemplary embodiment, pieces of information acquired from the peripheral apparatuses 200 by the processing apparatus 100 are classified on the basis of conditions on which the contents of the pieces of information are decided. Specifically, the pieces of information are classified on the basis of time conditions on which the pieces of information are decided. As an example, the pieces of information acquired from the peripheral apparatuses 200 are classified by taking a case where the information processing apparatus 10 is applied to the image processing apparatus 20 as an example.

First, there is information to be decided when firmware of the information processing apparatus 10 (image processing apparatus 20) is created. That is, the information is never changed. Examples of the information include a product name, the type of major function (information indicating classification of, for example, a multi-function printer, a printer dedicated machine, and a copy machine in the image processing apparatus 20), the performance of major functions (information indicating whether or not, for example, a copy function indicates color or only black and white in the image processing apparatus 20), or the like. In the following description, the information decided when the firmware is created will be called first information.

In addition, there is information to be decided during the startup of the information processing apparatus 10. The information may be changed due to a change in hardware, or the like, but is never changed during the operation of the information processing apparatus 10. Examples of the information include the storage capacity of the memory mounted on the control apparatus, the number of stages of a tray storing a recording material, the type of external apparatus in a case where an external apparatus such as a post-processing apparatus is added, or the like. In the following description, information to be decided during the startup of the information processing apparatus 10 will be called second information.

In addition, there is information to be decided at a point in time when an initial operation of the processing apparatus 100 or the peripheral apparatus 200 is terminated after the information processing apparatus 10 is started up. The information is information making it necessary to perform an initialization operation of the apparatus and another apparatus in a case where the information is changed due to a change in setting, or the like. For example, the information is information regarding whether the function of the peripheral apparatus 200 is valid or invalid, whether or not the function of the peripheral apparatus 200 is displayed on the display of the execution unit 110 of the processing apparatus 100, and state of the external apparatus (whether or not a failure has occurred, or the like), a connection state of a network in a case where an external apparatus such as a post-processing apparatus is applied, or the like. In the following description, the information to be decided at a point when the initialization operation is terminated will be called third information.

In addition, in a case where the information processing apparatus 10 is configured to require the authentication of an operator in order to use a specific function, there is information to be decided when authentication is performed. Examples of the information include inherent setting information associated with an operator specified by authentication, and the like. In the following description, the information to be decided during the authentication operation will be called fourth information.

In addition, there is information to be decided when a specific function is used (when software for realizing the function is started up). For example, the size of a recording material stored in each tray of the recording material storage unit 24 is decided when the function of the image forming unit 23 forming an image on a recording material having a designated size is used. In the following description, the information to be decided when the specific function is used (during the startup of software) will be called fifth information.

In addition, there is information to be decided when a specific function is selected due to a change in setting, or the like. For example, when there is a change in setting so as to use a tray having not been used in the recording material storage unit 24, information regarding whether or not a recording material is stored in a tray which is set to be newly used is decided. In the following description, the information to be decided when a specific function is selected due to a change in setting will be called sixth information.

Meanwhile, the third information to the sixth information are an example of classification based on a condition for specifying information, except for the first information and the second information that are decided at a point in time when the information processing apparatus 10 is started up in the above-described classification. A condition for specifying information may be specified, other than the conditions described with regard to the third information to the sixth information, and information may be classified on the basis of the condition.

Information Acquisition Unit

In this exemplary embodiment, in a case where pieces of information are acquired from the peripheral apparatuses 200 by the processing apparatus 100, the pieces of information classified as described above are acquired by different acquisition units in accordance with the classification. Meanwhile, in this exemplary embodiment, it is assumed that information to be acquired from the peripheral apparatus 200 by the processing apparatus 100 is represented as a variable or value of a program.

The first information is decided when firmware is created, and is then never changed. Consequently, the first information is written in a program to be executed by the execution unit 110 of the processing apparatus 100. The processing apparatus 100 reads the program to acquire the first information. As described above, in a case where the function of the processing apparatus 100 is realized by a web browser, the first information may be set to be a program in a format such as a JavaScript (registered trademark) file or a JavaScript Object Notation (JSON) file described as a variable or a value. These files may be directly loaded and analyzed by the function of the web browser. The program having the first information written therein is stored in a non-volatile storage apparatus such as a ROM or a Hard Disk Drive (HDD) together with other programs, firmware, and the like, and is embedded in the information processing apparatus 10. The files are read out from the storage apparatus by the program management server 210 during the startup of the information processing apparatus 10, and are transmitted to the processing apparatus 100.

The second information is decided during the startup of the information processing apparatus 10, and is then never changed during the operation of the information processing apparatus 10. Consequently, the second information is also written in a program to be executed by the execution unit 110 of the processing apparatus 100, similar to the first information. The processing apparatus 100 reads the program to acquire the second information. The program may be set to be a program in a format such as a JavaScript file or a JSON file in which the second information is described as a variable or a value, similar to the first information.

Incidentally, the second information is decided during the startup of the information processing apparatus 10. Therefore, the program having the second information written therein is generated, for example, by the peripheral apparatus 200 including the second information during the startup of the information processing apparatus 10. The program management server 210 acquires the program from the peripheral apparatus 200 and transmits the acquired program to the processing apparatus 100.

As described above, the first information and the second information are never changed during the operation of the information processing apparatus 10 after the information processing apparatus 10 is started up, and thus the processing apparatus 100 acquires the first and second information from the peripheral apparatus 200 (program management server 210) in a format of a program having information described therein. The processing apparatus 100 executes the acquired program as a partial program (program module) operating on a program (web browser) for realizing the function of the processing apparatus 100. With such a configuration, the processing apparatus 100 is not required to acquire the first information and the second information from the outside (the peripheral apparatus 200 and the information holding unit 120) during the execution of processing, and thus the amount of communication is reduced.

The third information is information to be decided at a point in time when an initialization operation of the processing apparatus 100 or the peripheral apparatus 200 is terminated. Therefore, the third information may be changed due to a setting operation or the like even during the operation of the information processing apparatus 10. For this reason, the third information may not be provided to the processing apparatus 100 from the peripheral apparatus 200 in a format of a program having the third information described therein, like the first information or the second information. Therefore, the third information is transmitted to the processing apparatus 100 from the peripheral apparatus 200 in a format of a variable or a value of a program to be executed by the execution unit 110 of the processing apparatus 100. Meanwhile, pieces of information of the peripheral apparatuses 200 are acquired from the respective peripheral apparatuses 200 by the information management server 220, and are transmitted to the processing apparatus 100.

Incidentally, the third information is information which is likely to be changed, but is limited to being changed when there is a change in setting. Therefore, the processing apparatus 100 may acquire the third information from the peripheral apparatus 200 (information management server 220) at a specific point in time when information is decided, and may hold the acquired third information in the information holding unit 120. In this manner, in a case where the processing apparatus 100 attempts to refer to the third information, the third information is not required to be acquired from the peripheral apparatus 200 when the third information is held in the information holding unit 120, and the processing apparatus 100 may refer to the third information by reading out the third information from the information holding unit 120. For this reason, the amount of communication is reduced.

The fourth information is information to be decided when the authentication of an operator is performed. Therefore, the fourth information may be changed during the operation of the information processing apparatus 10 similar to the third information, and thus it is not possible to provide the fourth information to the processing apparatus 100 from the peripheral apparatus 200 in a format of a program having the fourth information described therein. The fourth information is transmitted to the processing apparatus 100 from the peripheral apparatus 200 (information management server 220) in a format of a variable or a value of a program to be executed by the execution unit 110 of the processing apparatus 100. In addition, the fourth information is limited to being changed when the authentication of the operator is performed. Therefore, the processing apparatus 100 may acquire the fourth information from the peripheral apparatus 200 at a specific point in time when information is decided, and may hold the acquired fourth information in the information holding unit 120, similar to the third information.

The fifth information is information to be decided when a specific function is used (when software for realizing the function is started up). Therefore, the fifth information may be changed during the operation of the information processing apparatus 10, and thus it is not possible to provide the fifth information to the processing apparatus 100 from the peripheral apparatus 200 in a format of a program having the fifth information described therein. The fifth information is transmitted to the processing apparatus 100 from the peripheral apparatus 200 (information management server 220) in a format of a variable or a value of a program to be executed by the execution unit 110 of the processing apparatus 100. In addition, the fifth information is limited to being changed when a specific function is used. Therefore, the processing apparatus 100 may acquire the fifth information from the peripheral apparatus 200 at a specific point in time when information is decided, and may hold the acquired fifth information in the information holding unit 120.

The sixth information is information to be decided when a specific function is selected. Therefore, the sixth information may be changed during the operation of the information processing apparatus 10, and thus it is not possible to provide the sixth information to the processing apparatus 100 from the peripheral apparatus 200 in a format of a program having the sixth information described therein. The sixth information is transmitted to the processing apparatus 100 from the peripheral apparatus 200 (information management server 220) in a format of a variable or a value of a program to be executed by the execution unit 110 of the processing apparatus 100. In addition, the sixth information is limited to being changed when a specific function is selected. Therefore, the processing apparatus 100 may acquire the sixth information from the peripheral apparatus 200 at a specific point in time when information is decided, and may hold the acquired sixth information in the information holding unit 120.

Information on the peripheral apparatus 200 which is to be referred to when the processing apparatus 100 executes processing is not limited to the first information to the sixth information. For example, there is also information which is not decided until the processing apparatus 100 attempts to acquire the information from the peripheral apparatus 200. As a specific example, information, such as the number of images read by the reading unit 21, the number of recording materials which have an image formed thereon by the image forming unit 23 and are discharged, and a remaining amount of image forming agent (toner or the like) which is used to form an image by the image forming unit 23, changes in accordance with the operation of the information processing apparatus 10 (image processing apparatus 20). For this reason, the information is not decided until the processing apparatus 100 attempts to acquire the information from the peripheral apparatus 200. Therefore, this type of information does not contribute to a reduction in the amount of communication even when the processing apparatus 100 acquires the information from the peripheral apparatus 200 in advance and hold the acquired information in the information holding unit 120.

In addition, with respect to the third information to the sixth information, a description has been given of a case where the processing apparatus 100 acquires the information from the peripheral apparatus 200 at a specific point in time when the information is decided, and holds the acquired information in the information holding unit 120. Basically, the information may be acquired from the peripheral apparatus 200 at a point in time when the information is firstly required to be referred to in the processing of the execution unit 110, and the acquired information may be held in the information holding unit 120. In this manner, in a case where information is referred to after next time, information is not acquired again from the peripheral apparatus 200, and it is possible to read out information from the information holding unit 120 to refer to the information.

On the other hand, information to be referred to from a large number of execution units 110 and information with high frequency of reference may be acquired from the peripheral apparatus 200 and may be held in response to a request of the information holding unit 120 without depending on a request from the execution unit 110 when satisfying a condition on which the above-described pieces of information are decided. For example, in a case where an initialization operation of each peripheral apparatus 200 is terminated when the information holding unit 120 is started up as an initial operation during the startup of the information processing apparatus 10, the third information may be acquired from the peripheral apparatus 200 at a point in time when the information holding unit 120 is started up, and may be held. In addition, when the information processing apparatus 10 is an apparatus for starting up the processing apparatus 100 again in a case where the authentication of the operator is performed, the fourth information may also be acquired from the peripheral apparatus 200 at a point in time when the information holding unit 120 is started up, and may be held.

In addition, the information holding unit 120 establishes communication with the notification server 230 at all times, and receives notice from the notification server 230 when the third information to the sixth information are updated. For this reason, the information holding unit 120 may acquire the updated information from the peripheral apparatus 200 (information management server 220) again on the basis of the notice received from the notification server 230 to hold the latest information. Therefore, even when there is a possibility that information is updated after the startup of the information holding unit 120, the information holding unit 120 may acquire the information from the peripheral apparatus 200 and hold the acquired information during the startup of the information holding unit. As an example, information to be referred to from a larger number of execution units 110 than a number determined in advance may be acquired from the peripheral apparatus 200 and held during the startup of the information holding unit 120, and information to be referred to from only the number of execution units which is equal to or less than the number determined in advance may be acquired from the peripheral apparatus 200 and held in response to the first request from the execution unit 110.

Meanwhile, the acquisition unit and the acquisition method which are described above with respect to the third information to the sixth information are not necessarily applied to only the third information to the sixth information. The above-described acquisition unit and acquisition method may be applied to pieces of information classified on the basis of any condition for deciding information.

Information Acquisition Operation

Next, an information acquisition operation of the processing apparatus 100 according to this exemplary embodiment will be described. In this exemplary embodiment, the execution unit 110 and the information holding unit 120 acquire information from the peripheral apparatus 200 on individual conditions. Hereinafter, an operation during startup and an operation during the updating of held information will be described as operations of the information holding unit 120, and an operation during startup and an operation during re-startup will be described as operations of the execution unit 110. Plural execution units 110 are provided, and the same operation is performed during startup and re-startup for each execution unit 110.

Figure 3:
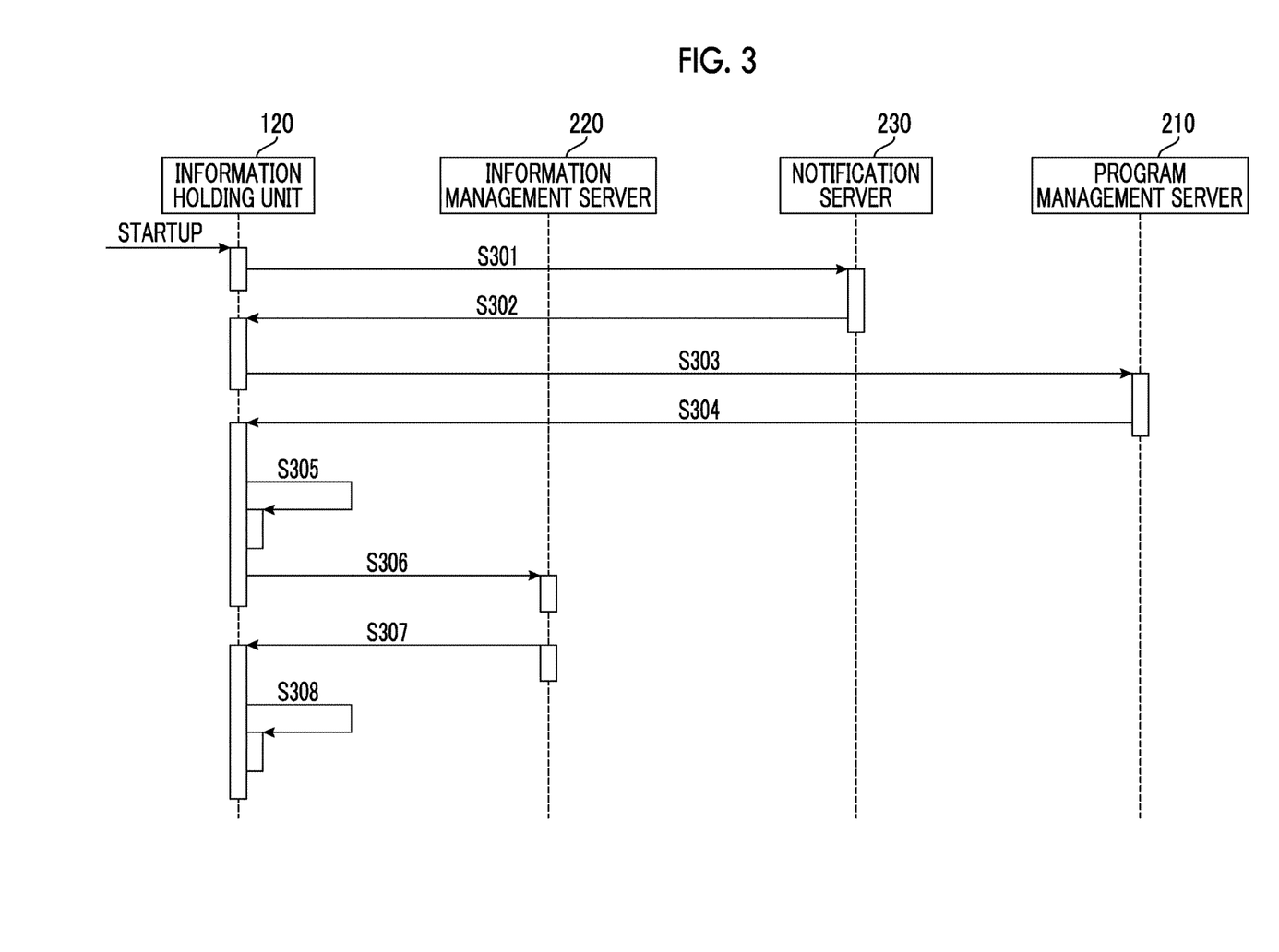
FIG. 3 is a diagram illustrating the operation (startup sequence) of a processing apparatus and a peripheral apparatus during the startup of an information holding unit.

FIG. 3 is a diagram illustrating the operation (startup sequence) of the processing apparatus 100 and the peripheral apparatus 200 during the startup of the information holding unit 120. The information holding unit 120 is started up in accordance with the startup of the processing apparatus 100. When the information holding unit 120 is started up, the information holding unit first requests the notification server 230 to establish communication (S301). The notification server 230 establishes communication with the information holding unit 120, and notifies the information holding unit 120 that the communication has been successfully established (S302).

Next, the information holding unit 120 requests a program file including information on the peripheral apparatus 200 from the program management server 210 (S303). The program management server 210 transmits a program file (program file having the first information described therein) which is stored in a storage apparatus such as a ROM and is prepared in advance, and a program file (program file having the second information described therein) which is acquired from the peripheral apparatus 200 to the information holding unit 120 (S304). The information holding unit 120 holds the program files received from the program management server 210 (S305).

Next, the information holding unit 120 requests information (third information to sixth information) on the peripheral apparatus 200 from the information management server 220 (S306). The information management server 220 transmits information (information represented in a format of a variable or a value of a program to be executed by the execution unit 110) which is acquired from the peripheral apparatus 200 to the information holding unit 120 (S307). The information holding unit 120 holds the information received from the information management server 220 (S308).

Figure 4:
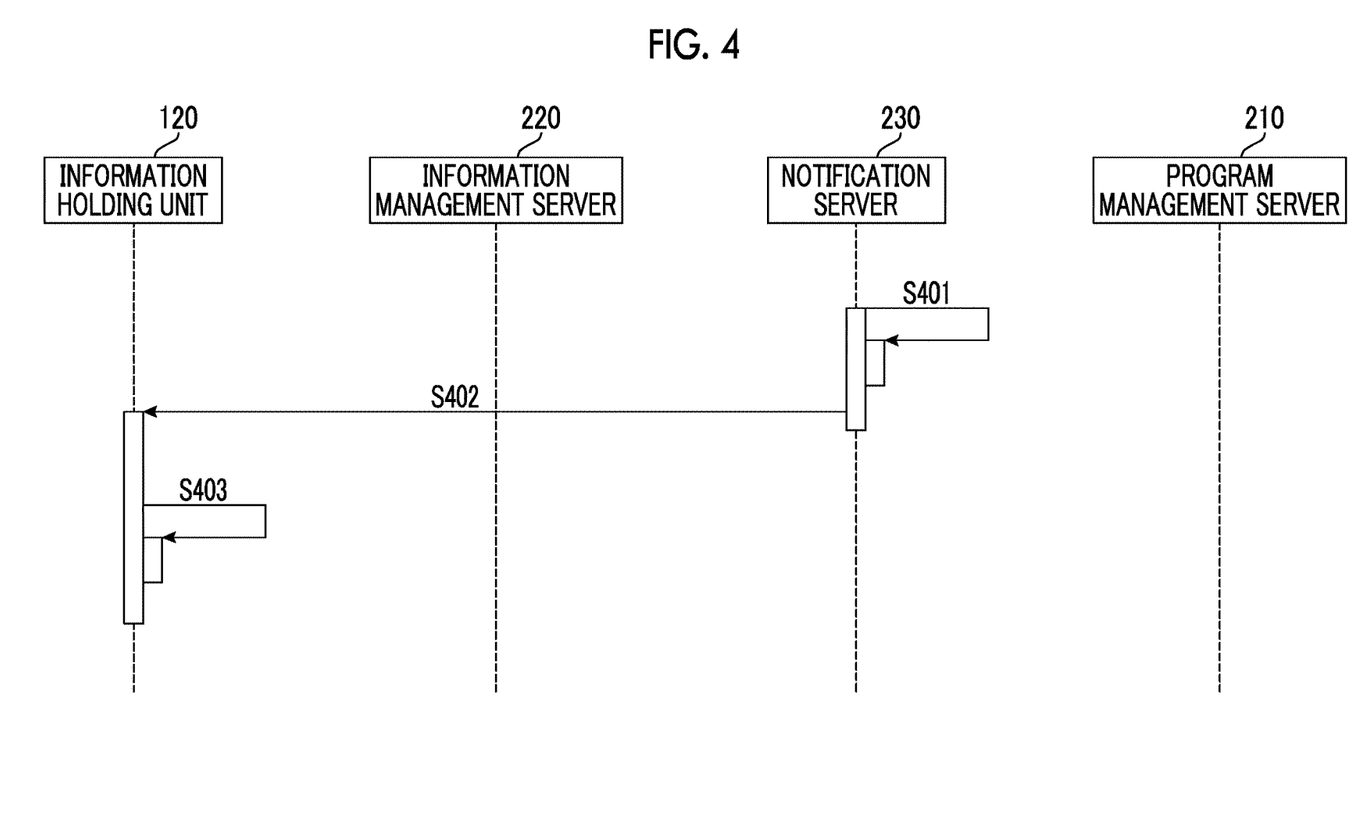
FIG. 4 is a diagram illustrating the operation (update sequence) of the processing apparatus and the peripheral apparatus when information managed in an information management server is updated.

FIG. 4 is a diagram illustrating the operation (update sequence) of the processing apparatus 100 and the peripheral apparatus 200 when information managed in the information management server 220 is updated. When the information managed in the information management server 220 is updated, the notification server 230 detects the updating of the information (S401), and notifies the information holding unit 120 of the updated information (S402). The information holding unit 120 updates the corresponding information on the basis of the notice from the notification server 230 (S403).

Figure 5:
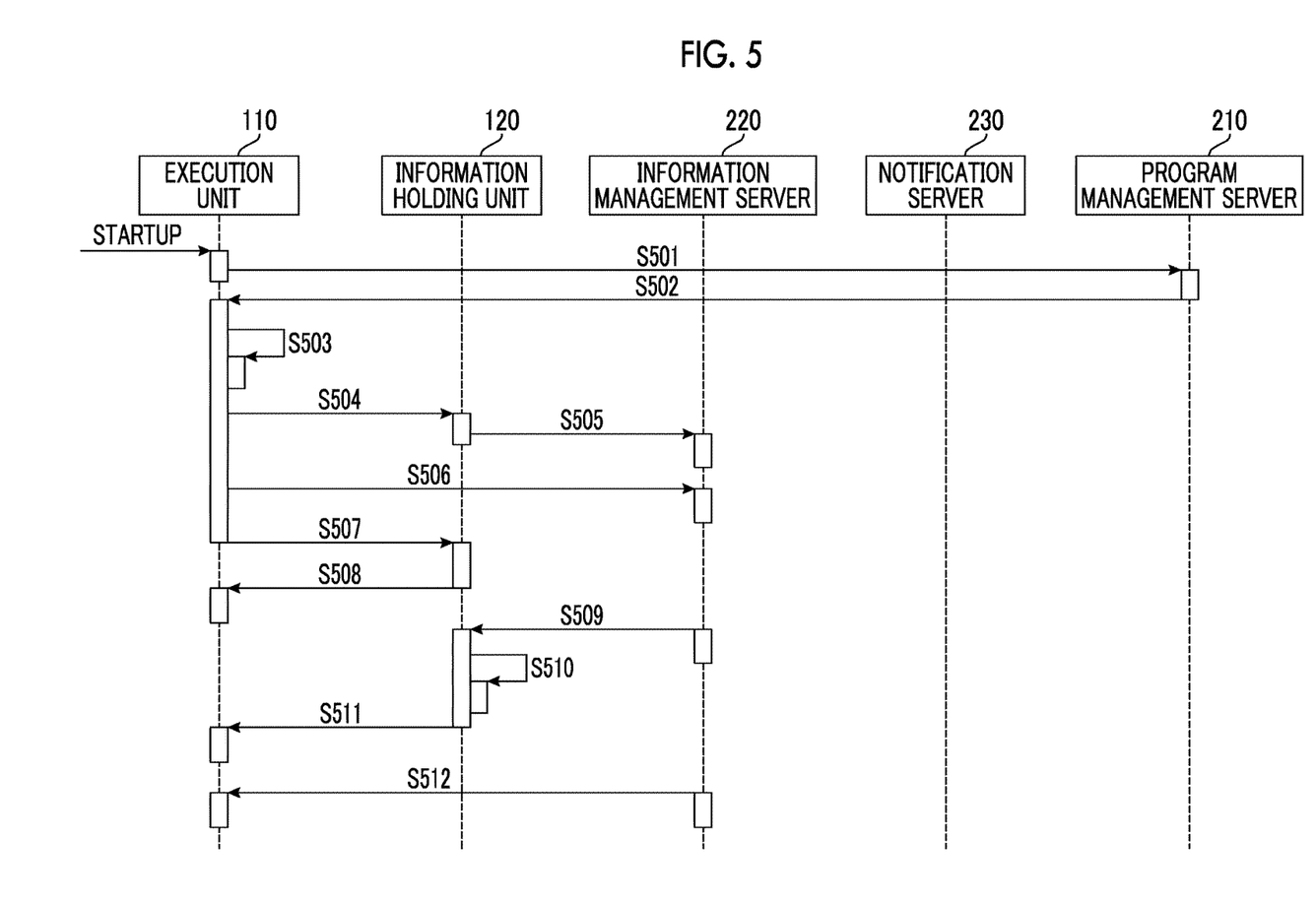
FIG. 5 is a diagram illustrating the operation (startup sequence) of the processing apparatus and the peripheral apparatus during the first startup of an execution unit.

FIG. 5 is a diagram illustrating the operation (startup sequence) of the processing apparatus 100 and the peripheral apparatus 200 during the first startup of the execution unit 110. The execution unit 110 is started up when satisfying a predetermined start-up condition such as an operation of the operator of the information processing apparatus 10 or a call from another execution unit 110. When The execution unit 110 is started up, the execution unit first requests a program file including information on the peripheral apparatus 200 from the program management server 210 and the information holding unit 120 (S501). The program management server 210 transmits a program file (program file having the first information described therein) which is stored in a storage apparatus such as a ROM and is prepared in advance, and a program file (program file having the second information described therein) which is acquired from the peripheral apparatus 200 to the execution unit 110 (S502). In addition, when the information holding unit 120 holds the program file (program file having the second information described therein) which is acquired from the peripheral apparatus 200, the information holding unit transmits the held program file to the execution unit 110. The execution unit 110 reads the program files received from the program management server 210 and the information holding unit 120 (S503).

Next, the execution unit 110 acquires information (information other than the first information and the second information) on the peripheral apparatus 200. Here, the execution unit 110, the information holding unit 120, and the information management server 220 performs different operations depending on the type of information. Here, it is assumed that the types of information include information (hereinafter, first holding information) which is acquired from the information management server 220 during the startup of the information holding unit 120 and is held in the information holding unit 120, information (hereinafter, second holding information) which is acquired from the information management server 220 in response to the first request by the execution unit 110 and is held in the information holding unit 120, and information (hereinafter, non-holding information) which is not held in the information holding unit 120. In the example illustrated in FIG. 5, it is assumed that the execution unit 110 requests information in order of the second holding information, the non-holding information, and the first holding information.

The execution unit 110 first requests the second holding information from the information holding unit 120 (S504). In a case where this request is the first request by the execution unit 110 after the information processing apparatus 10 is started up, the second holding information is not held in the information holding unit 120. Therefore, the information holding unit 120 requests the second holding information from the information management server 220 (S505). Next, the execution unit 110 requests the non-holding information from the information management server 220 (S506). Since the non-holding information is not held in the information holding unit 120, the execution unit 110 directly requests the non-holding information from the information management server 220.

Next, the execution unit 110 requests the first holding information from the information holding unit 120 (S507). The first holding information is held by the information holding unit 120 in a step in which a condition for deciding information is satisfied. Therefore, the information holding unit 120 returns the first holding information in response to the request from the execution unit 110 (S508). That is, the exchange of the first holding information is performed only between the execution unit 110 and the information holding unit 120 in the processing apparatus 100, and communication between the processing apparatus 100 and the peripheral apparatus 200 is not performed.

The information management server 220 returns the second holding information to the information holding unit 120 in response to a request received from the information holding unit 120 (S509). The information holding unit 120 holds the second holding information received from the information management server 220 (S510), and transmits the held second holding information to the execution unit 110 (S511). The second holding information is once held in the information holding unit 120, and is then continuously held even when the execution unit 110 is stopped. In addition, the information management server 220 returns the non-holding information to the execution unit 110 in response to a request received from the execution unit 110 (S512).

Figure 6:
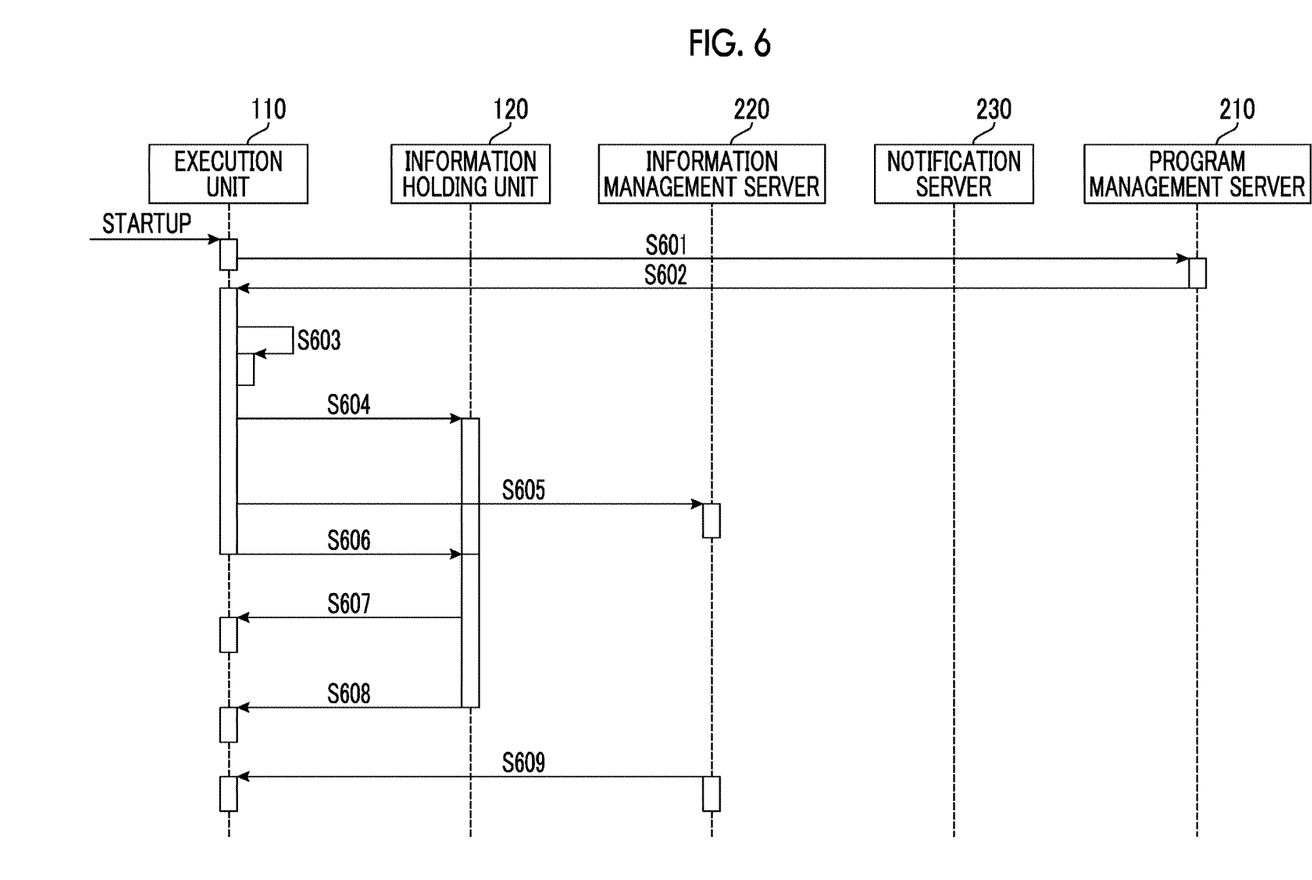
FIG. 6 is a diagram illustrating the operation (startup sequence) of the processing apparatus and the peripheral apparatus during the second re-startup (during the second or subsequent startup) of the execution unit.

FIG. 6 is a diagram illustrating the operation (startup sequence) of the processing apparatus 100 and the peripheral apparatus 200 during the re-startup (during the second or subsequent startup) of the execution unit 110. The operation of the execution unit 110 during the re-startup is the same as the operation during the first startup illustrated in FIG. 5. That is, when the execution unit 110 is started up, the execution unit first requests a program file including information on the peripheral apparatus 200 from the program management server 210 and the information holding unit 120 (S601). The program management server 210 transmits a program file having the first information described therein and a program file having the second information described therein to the execution unit 110 (S602). In addition, when the information holding unit 120 holds the program file having the second information described therein, the information holding unit transmits the held program file to the execution unit 110. The execution unit 110 reads the program files received from the program management server 210 and the information holding unit 120 (S603).

The execution unit 110 acquires information (information other than the first information and the second information) on the peripheral apparatus 200. Here, it is assumed that the execution unit 110 requests information in order of second holding information, non-holding information, and first holding information, similar to the operation described with reference to FIG. 5. That is, the execution unit 110 first requests the second holding information from the information holding unit 120 (S604). Next, the execution unit 110 requests the non-holding information from the information management server 220 (S605). Next, the execution unit 110 requests the first holding information from the information holding unit 120 (S606).

At this time, the information holding unit 120 holds the second holding information acquired in response to the request from the execution unit 110 during the first operation of the execution unit 110, together with the first holding information. Therefore, the information holding unit 120 transmits the second holding information to the execution unit 110 in response to the request from the execution unit 110 (S607). In addition, the information holding unit 120 transmits the first holding information to the execution unit 110 in response to the request from the execution unit 110 (S608). In addition, the information management server 220 transmits the non-holding information to the execution unit 110 in response to the request from the execution unit 110 (S609).

As described above, according to this exemplary embodiment, the second holding information is held in the information holding unit 120 during the second or subsequent startup of the execution unit 110. Therefore, the exchange of the second holding information is performed only between the execution unit 110 and the information holding unit 120 in the processing apparatus 100, and communication between the processing apparatus 100 and the peripheral apparatus 200 is not performed.

Other Exemplary Embodiments

Figure 7:
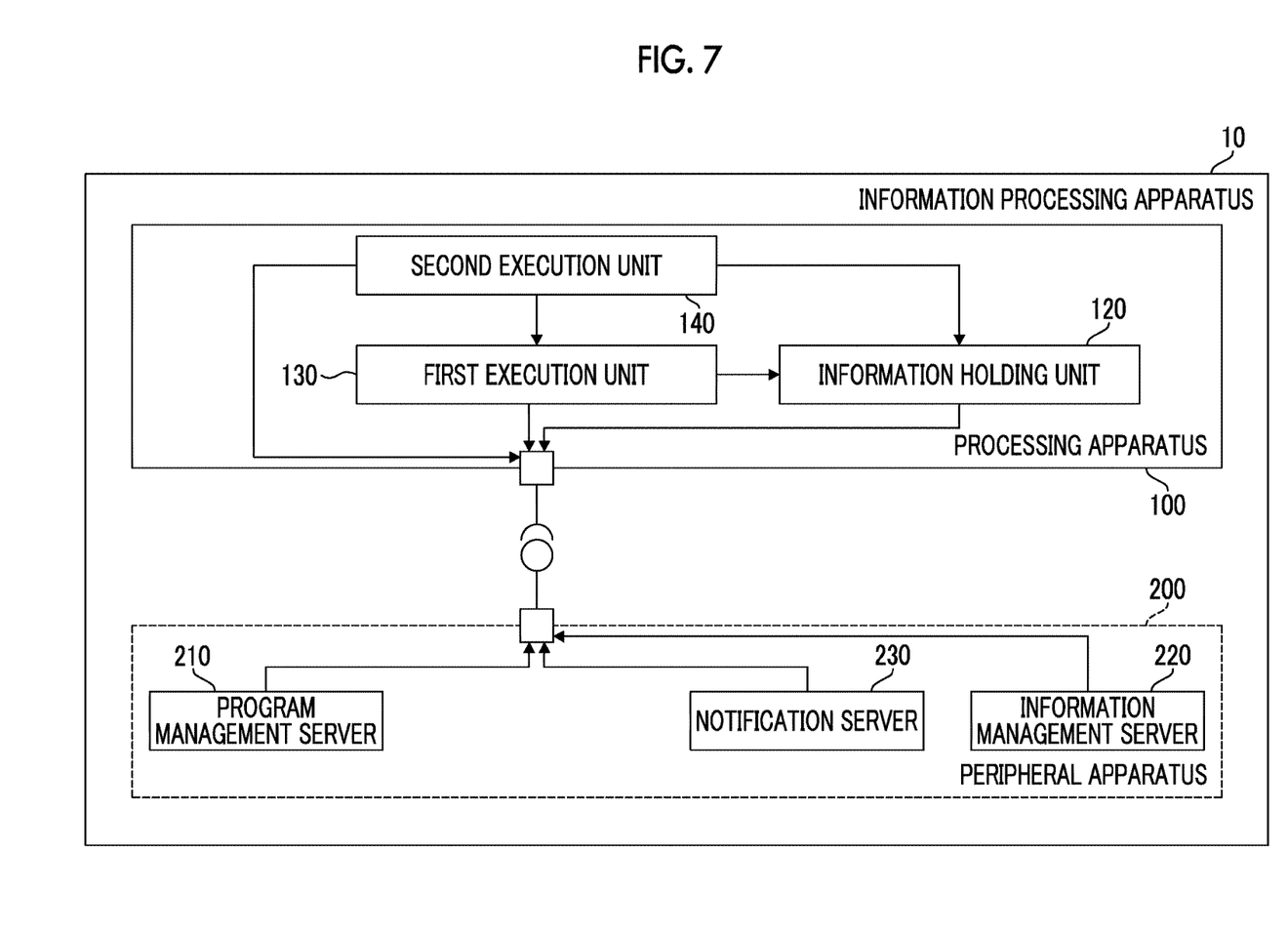
FIG. 7 is a diagram illustrating the overall configuration of an information processing apparatus according to a second exemplary embodiment.

FIG. 7 is a diagram illustrating the overall configuration of an information processing apparatus 10 according to a second exemplary embodiment. In the configuration illustrated in FIG. 7, a processing apparatus 100 includes a first execution unit 130, a second execution unit 140, and an information holding unit 120. The information holding unit 120 is the same as the information holding unit 120 described with reference to FIG. 1. In addition, in the configuration illustrated in FIG. 7, a peripheral apparatus 200 is the same as the peripheral apparatus 200 described with reference to FIG. 1.

The first execution unit 130 and the second execution unit 140 are paired, and the processing apparatus 100 illustrated in FIG. 7 includes plural pairs of the first execution unit 130 and the second execution unit 140, similar to the processing apparatus 100 including the plural execution units 110 described with reference to FIG. 1. For example, a case where the processing apparatus 100 illustrated in FIG. 7 is applied to the operation unit 29 of the image processing apparatus 20 illustrated in FIG. 2. In this case, it is assumed that the first execution unit 130 performs a function of controlling, for example, the switching of display of an operation screen and receiving an operator's operation to output a control command of the peripheral apparatus 200. In addition, it is assumed that the second execution unit 140 performs a function of editing the operation screen on the basis of information on the peripheral apparatus 200 and displaying the edited operation screen on a display.

The first execution unit 130 is started up in accordance with the startup of the processing apparatus 100 and continuously operates until the processing apparatus 100 is stopped, similar to the information holding unit 120. In addition, the first execution unit 130 acquires second holding information to be referred to by only the first execution unit or the second execution unit 140 corresponding to the first execution unit (not to be referred to by the other first execution units 130 from the peripheral apparatus 200 (information management server 220) and holds the acquired information, for example, during the startup of the first execution unit.

The second execution unit 140 is started up when satisfying a start-up condition which is set in advance, and is stopped when satisfying a stop condition which is set in advance. For example, the second execution unit may be configured to be started up and to stop in accordance with an operation of the operator of the information processing apparatus 10. In addition, the second execution unit may be configured to be started up on a condition that a call is given from another first execution unit 130 or second execution unit 140 or information on the peripheral apparatus 200 which is to be referred to in the processing of the first execution unit 130 pairing with the second execution unit.

When the second execution unit 140 is started up, the second execution unit requests a program file including information on the peripheral apparatus 200 from the program management server 210 and the information holding unit 120 and reads the program files received from the program management server 210 and the information holding unit 120, similar to the operation of the execution unit 110 illustrated in FIGS. 5 and 6. In addition, the second execution unit 140 acquires second holding information, to be referred to by only the second execution unit itself, which is held in the first execution unit 130, acquires first holding information and second holding information that are held in the information holding unit 120, and acquires non-holding information from the peripheral apparatus 200 (information management server 220).

According to this exemplary embodiment, the second holding information to be referred to by only the second execution unit itself is held in the first execution unit 130 at a point in time when the second execution unit 140 is started up. Therefore, it is possible to omit communication between the processing apparatus 100 and the peripheral apparatus 200 even during the first startup of the second execution unit 140.

Figure 8:
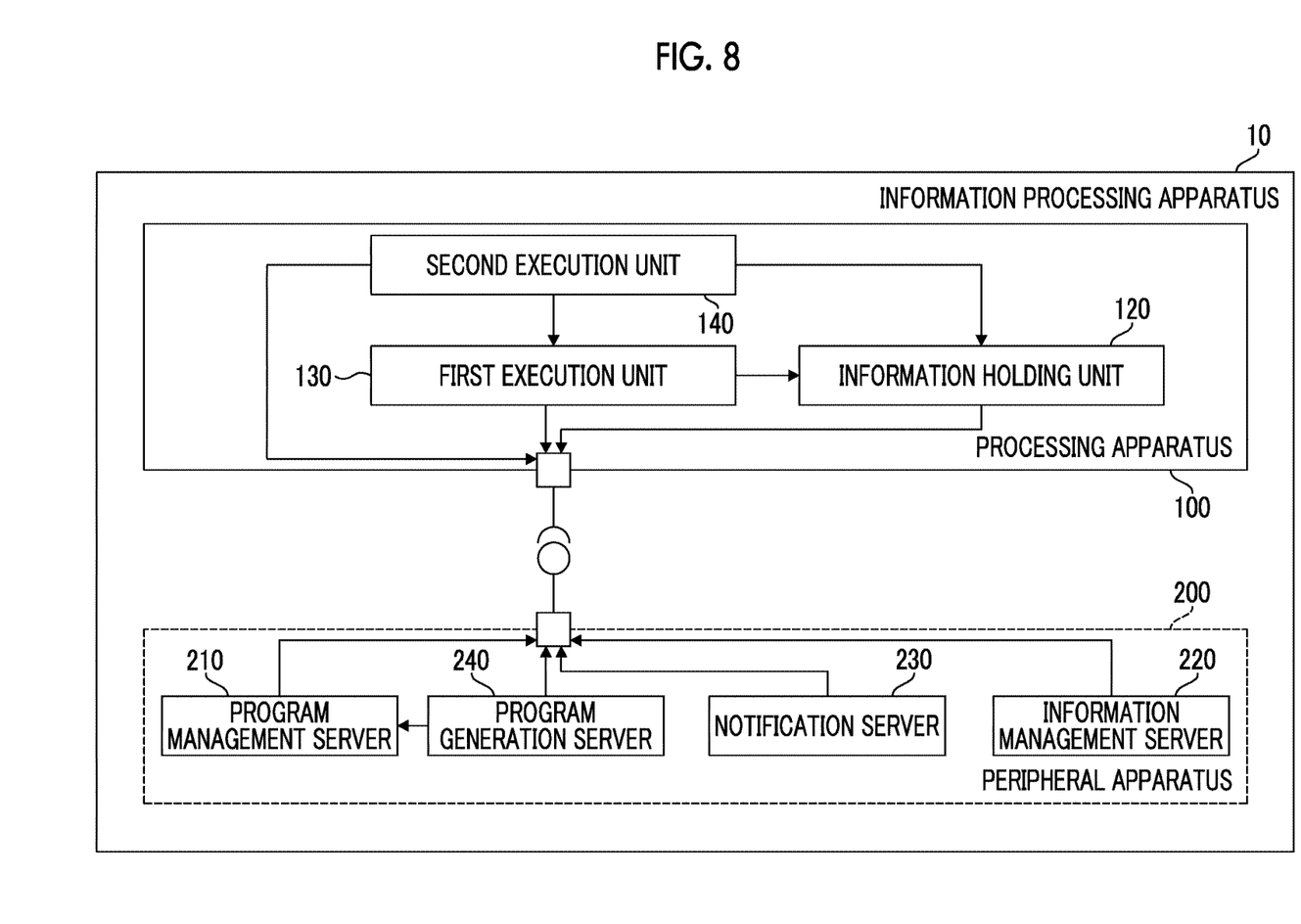
FIG. 8 is a diagram illustrating the overall configuration of an information processing apparatus according to a third exemplary embodiment.

FIG. 8 is a diagram illustrating the overall configuration of an information processing apparatus 10 according to a third exemplary embodiment. In the configuration illustrated in FIG. 8, a processing apparatus 100 is the same as the processing apparatus 100 described with reference to FIG. 7. In addition, in the configuration illustrated in FIG. 8, a peripheral apparatus 200 includes a program management server 210, an information management server 220, a notification server 230, and a program generation server 240. The program management server 210, the information management server 220, and the notification server 230 are the same as the servers described with reference to FIG. 1. In a case where there is information decided out of third information to sixth information, the program generation server 240 generates a program in which the information (information satisfying a condition for deciding the information) is described as a variable or a value. The generated program is managed by the program management server 210. The program is transmitted to the first execution unit 130 or the information holding unit 120 from the program management server 210 in response to a request from the first execution unit 130 or the information holding unit 120 of the processing apparatus 100.

The third information to the sixth information based on the above-described classification of information are decided when satisfying respective specific conditions. Consequently, after information is decided (a condition for deciding information is satisfied) with respect to the third information to the sixth information, the program generation server 240 according to this exemplary embodiment generates a program including the information. For example, as the third information, function information in function setting of the peripheral apparatus 200 is considered. When the function information is updated addition, correction, deletion, and the like, the updated information is decided by the execution of an initialization operation of the peripheral apparatus 200. Consequently, after the initialization operation of the peripheral apparatus 200 is terminated, a program having the updated function information described as a variable or a value is generated. In addition, as the fourth information, setting information to be applied on a condition of authentication is considered. When the setting information is updated by addition, correction, deletion, and the like, the updated information is decided when the authentication of the operator is performed. Consequently, after the authentication of the operator is performed, a program having the updated setting information described as a variable or a value is generated. In addition, when authentication information is updated by addition, correction, deletion, and the like, a program having the updated setting information described as a variable or a value is generated after satisfying a condition for deciding the updated information.

Meanwhile, information for allowing the program generation server 240 according to this exemplary embodiment to generate a program is not limited to the above-described third information to sixth information. After information classified on the basis of any condition for deciding information satisfies the condition even when the information does not correspond to the third information to the sixth information, it is possible to generate a program including the information.

The program generated as described above is executed by the first execution unit 130 or the second execution unit 140. In this case, information acquired from the peripheral apparatus 200 is described in the program, and thus it is not also necessary to acquire the information from the peripheral apparatus 200 and to acquire the information from the information holding unit 120. Therefore, communication for acquiring the pieces of information is omitted during the execution of the program. Meanwhile, the program generation server 240 may be constituted by an RE presentational State Transfer (REST) server, for example, in a case where communication between the processing apparatus 100 and the peripheral apparatus 200 is performed by an HTTP.

Other Modification Examples

In the above-described exemplary embodiments, a configuration in which the processing apparatus 100 and the peripheral apparatus 200 are included in one information processing apparatus 10 has been described as an example. However, a specific configuration of the invention is not limited to the above-described exemplary embodiments. For example, an information processing apparatus corresponding to the processing apparatus 100 and an external apparatus corresponding to the peripheral apparatus 200 may be applied to an information processing system connected thereto through a network. In this case, the information processing apparatus includes an information holding unit that holds pieces of information acquired from the external apparatus, and an execution unit that performs execution with reference to the pieces of information acquired from the external apparatus. The information holding unit is started up in accordance with the startup of the information processing apparatus. The execution unit is started up when satisfying a predetermined start-up condition such as a start-up operation based on the operation of the information processing apparatus or a call from another execution unit. The pieces of information acquired from the external apparatus are classified like, for example, the above-described first information to sixth information in accordance with a condition for deciding the pieces of information. However, in a case of classification as in the above-described exemplary embodiments, the second information is decided for each external apparatus during the startup of each external apparatus. With such a configuration, the first information and the second information are transmitted to the information processing apparatus as a program, having the information described therein, which is executable by the execution unit of the information processing apparatus, and the execution unit executes the program. The other pieces of information are transmitted to the information processing apparatus from the external apparatuses at a timing which is determined in advance after the pieces of information are decided in the external apparatuses (after a condition for deciding the information is satisfied), and are read to the execution unit or are held in the information holding unit. As an acquisition unit and an acquisition method for acquiring pieces of information from the external apparatuses by the information processing apparatus, the units and the methods described in the above-described exemplary embodiments may be applied.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory, configured to hold pieces of information acquired from an external apparatus;
   a processor, configured to read a partial program having specific information, among the pieces of information acquired from the external apparatus, described therein, and execute a program including the partial program with reference to the pieces of information held in the memory,
   wherein the memory is started up in accordance with startup of the information processing apparatus, acquires information satisfying a specific condition, among the pieces of information acquired from the external apparatus, from the external apparatus when the memory itself is started up, and acquires information not satisfying the specific condition from the external apparatus in response to a request from the processor.

2. The information processing apparatus according to claim 1,
wherein at least a portion of a plurality of partial programs is acquired and is held in the memory, and the processor reads the partial program from the memory.

3. The information processing apparatus according to claim 2,
wherein a plurality of processors are provided, and
wherein the memory further acquires information to be referred to from a larger number of processors than a number determined in advance, among the pieces of information acquired from the external apparatus, from the external apparatus when the memory itself is started up, and acquires information to be referred to from only the number of processors, which is equal to or less than the number determined in advance, from the external apparatus in response to a request from the processor.

4. The information processing apparatus according to claim 3,
wherein the processor directly acquires information, which is acquired from the external apparatus, is not described in the partial program, and is not held in the memory, from the external apparatus.

5. The information processing apparatus according to claim 2,
wherein the processor directly acquires information, which is acquired from the external apparatus, is not described in the partial program, and is not held in the memory, from the external apparatus.

6. The information processing apparatus according to claim 2,
wherein the processor directly acquires information, which is acquired from the external apparatus, is not described in the partial program, and is not held in the memory, from the external apparatus.

7. The information processing apparatus according to claim 1,
wherein a plurality of processors are provided, and
wherein the memory further acquires information to be referred to from a larger number of processors than a number determined in advance, among the pieces of information acquired from the external apparatus, from the external apparatus when the memory itself is started up, and acquires information to be referred to from only the number of processors, which is equal to or less than the number determined in advance, from the external apparatus in response to a request from the processor.

8. The information processing apparatus according to claim 7,
wherein the processor directly acquires information, which is acquired from the external apparatus, is not described in the partial program, and is not held in the memory, from the external apparatus.

9. The information processing apparatus according to claim 1,
wherein the processor directly acquires information, which is acquired from the external apparatus, is not described in the partial program, and is not held in the memory, from the external apparatus.

10. The information processing apparatus according to claim 1,
wherein the processor directly acquires information, which is acquired from the external apparatus, is not described in the partial program, and is not held in the memory, from the external apparatus.

11. An information processing apparatus comprising:
a plurality of peripheral apparatuses; and
a processing apparatus that executes processing on the basis of pieces of information acquired from the peripheral apparatuses,
wherein the processing apparatus includes
a memory configured to hold the pieces of information acquired from the peripheral apparatuses, and
a processor configured to read a partial program having specific information, among the pieces of information acquired from the peripheral apparatuses, described therein, and execute a program including the partial program with reference to the pieces of information held in the memory,
wherein the memory is started up in accordance with startup of the information processing apparatus, acquires information satisfying a specific condition, among the pieces of information acquired from the peripheral apparatuses, from the peripheral apparatuses when the memory itself is started up, and acquires information not satisfying the specific condition from the peripheral apparatuses in response to a request from the processor.

12. The information processing apparatus according to claim 11,
wherein a partial program in which information decided at a point in time when the information processing apparatus is started up is described, among the plurality of partial programs, is generated in accordance with the startup of the information processing apparatus, is acquired, and is held in the memory, and the processor reads the partial program from the memory.

13. A non-transitory computer readable medium storing a program controlling a computer having a processor and a storage apparatus, the program causing the computer to:
acquire pieces of information from an external apparatus and hold the pieces of information in a storage apparatus; and
read a partial program having specific information, among the pieces of information acquired from the external apparatus, described therein, and execute a program including the partial program with reference to the pieces of information held in the storage apparatus,
wherein the storage apparatus is started up in accordance with startup of the computer, acquires information satisfying a specific condition, among the pieces of information acquired from the external apparatus, from the external apparatus when the storage apparatus itself is started up, and acquires information not satisfying the specific condition from the external apparatus in response to a request from the processor.

* * * * *